INVENTOR
CLINTON E. BROWN

*Finnegan, Henderson & Farabow*
ATTORNEYS

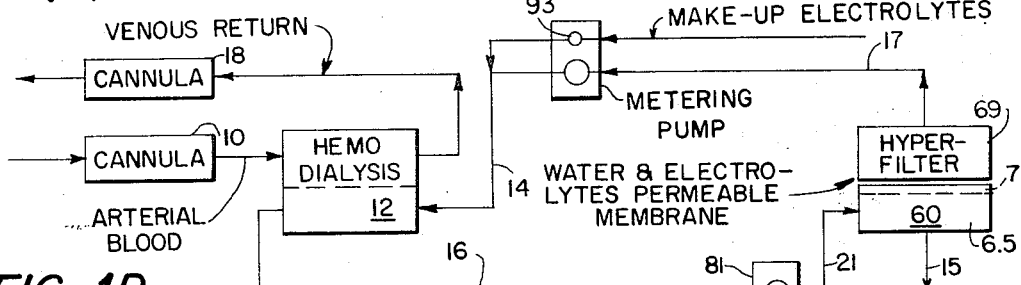
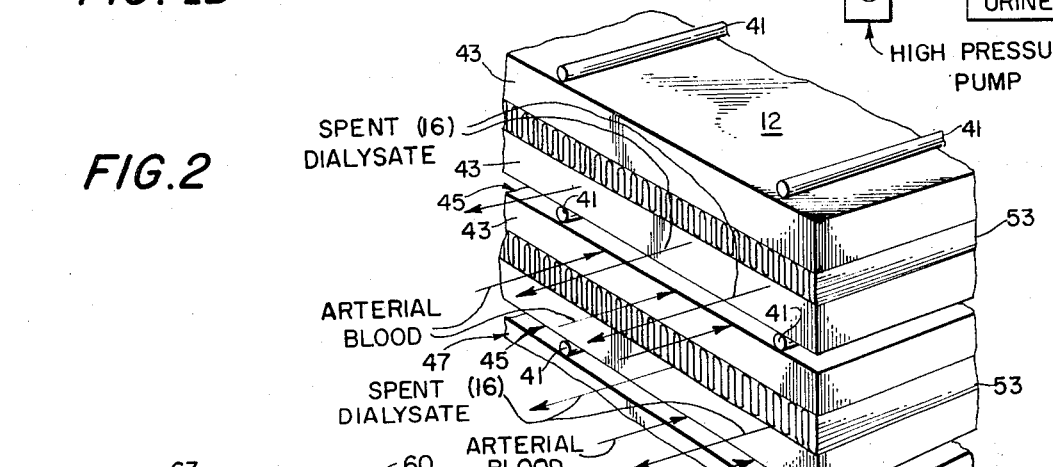
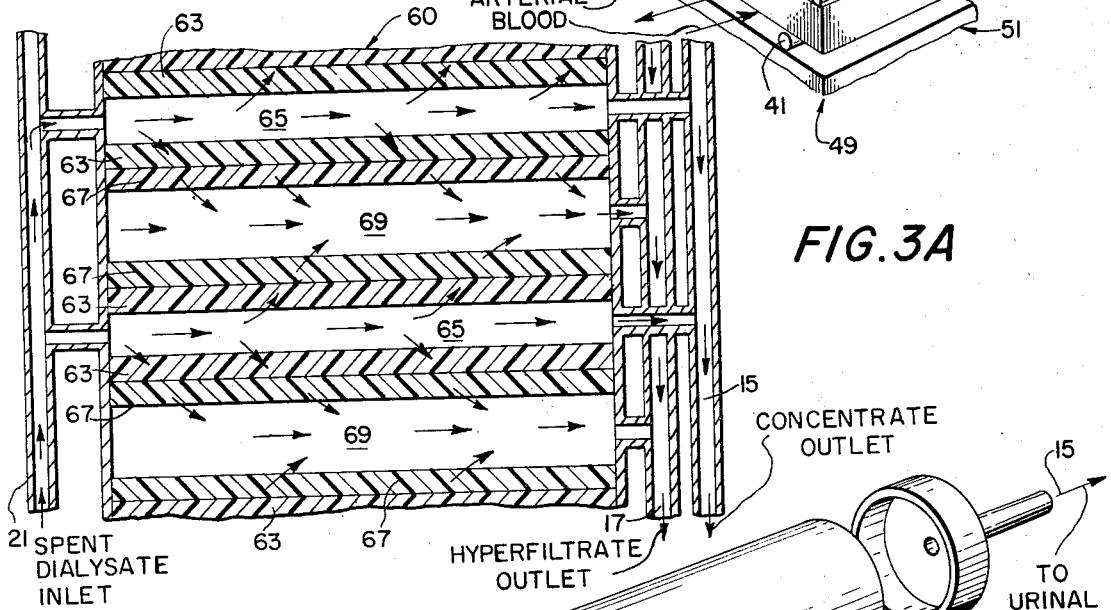

INVENTOR
CLINTON E. BROWN

Finnegan, Henderson & Farabow
ATTORNEYS

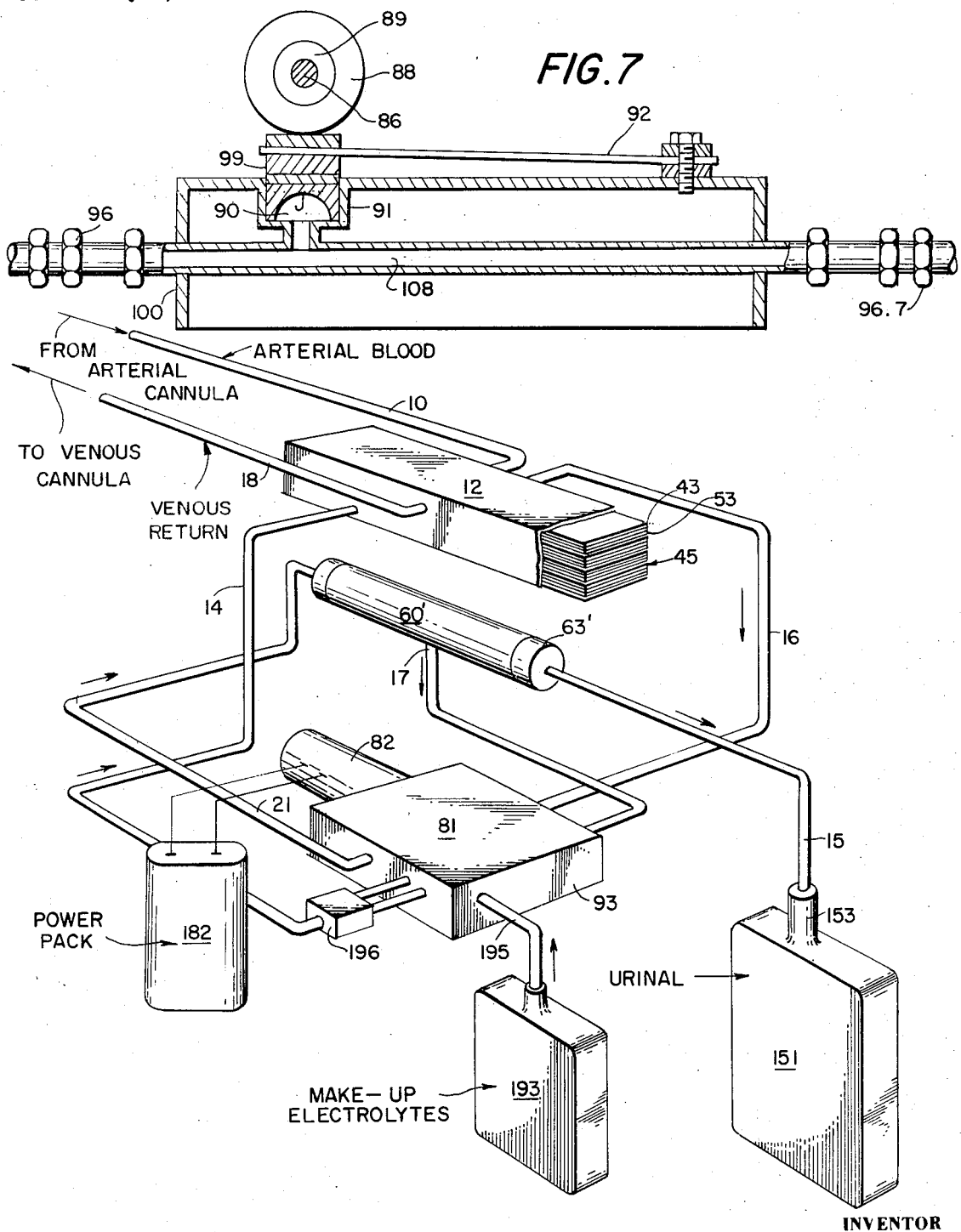

United States Patent Office 3,799,873
Patented Mar. 26, 1974

3,799,873
ARTIFICIAL KIDNEY
Clinton E. Brown, Silver Spring, Md., assignor to Hydronautics, Incorporated, Laurel, Md.
Continuation-in-part of abandoned application Ser. No. 3,102, Jan. 15, 1970, which is a continuation-in-part of application Ser. No. 722,727, Apr. 19, 1968, now Patent No. 3,579,441. This application July 9, 1971, Ser. No. 161,864
Int. Cl. B01d 13/00
U.S. Cl. 210—22
25 Claims

ABSTRACT OF THE DISCLOSURE

An extra-corporeal device employing dialysis and filtration means performs the function of a natural kidney. In the device, a bodily fluid such as peritoneal fluid or arterial blood is withdrawn from the body and passed through a dializer that causes selective diffusion of toxic, low molecular weight solutes into a water-containing dialysate. The dialysate and solutes are then passed through a filtration means or combination of filtration and electrodialzing means that permit only the passage of pure water or pure water and dissolved electrolytes while retaining the low molecular weight toxic solutes. The purified filtrate from the filtration means is recycled and combined with a controlled amount of make-up electrolyte solution as the dialysate for the dialyzer and the unfiltered residue from the filtration means is discharged as waste. The peritoneal fluid or blood in transit through the dialyzer is thus cleansed of toxic substances and is suitable for return.

This application is a continuation-in-part of my copending application Ser. No. 3,102, filed Jan. 15, 1970, now abandoned, which is a continuation-in-part of application Ser. No. 722,727, filed Apr. 19, 1968, now U.S. Pat. No. 3,579,441.

This invention relates to artificial kidneys for removing toxic substances from bodily fluids, such as blood or peritoneal fluid. In recent years the use of such devices has prolonged the lives of human beings with damaged or inoperative kidneys. The physiology of the human kidney is fairly well understood and involves the removal of nonvolatile wastes from the bloodstream and the continuous regulation of the blood composition such that the conditions in body tissues necessary for the life of cells are maintained. Accordingly, when the kidneys are not operating properly, these functions must be performed by some artificial means, lest conditions of uremia and eelctrolyte imbalance develop. Once these conditions exist, the bloodstream becomes increasingly toxic.

Artificial kidneys have been developed which, when used for several hours several times per week are capable of reducing the level of concentration of toxic substances in the blood. A "wash" solution, carefully formulated so as to be isotonic to blood, is introduced into these devices such that certain desirable constituents of the blood, e.g., electrolytes, are not lost.

It can be seen that the use of these prior art devices raises several serious problems. First, a high volume of reconstituting or "wash" solution is required. This large amount of liquid is generally supplied from a bulky and immobile reservoir. Second, prior art devices are used discontinuously. Periods of dialysis shorter than six (6) hours twice a week appear to be ineffective, and during the dialysis period the patient is immobile. Another undesirable but inavoidable effect of discontinuous use is a periodic buildup and withdrawal of wastes. Just before the use of a prior art artificial kidney, the concentration of various solutes in the patient's bloodstream is abnormally high, and just after treatment the concentration throughout the body may not be in equilibrium with its inherent undesirable effects. Third, the known devices are expensive to use and require the assistance of trained personnel.

In my U.S. Pat. No. 3,579,441, many of the problems of prior art artificial kidneys were basically solved. In this patent, there is described a device employing a plurality of filtration means that perform in combination the functions of a normal kidney. Arterial blood is first filtered through a plurality of highly selective ultrafiltration membranes that are designed to retain macromolceular weight blood constituents while permitting the passage of water and the low molecular weight toxic solutes in the blood. The filtrate containing the water and solutes is then passed through a plurality of even finer, hyperfiltration membranes that permit only the passage of pure water as filtrate while retaining the toxic solutes on the membranes. The solutes retained by the hyperfilters are discharged as waste and the purified filtrate consisting essentially of pure water or pure water and electrolytes is mixed with the macromolecular weight blood constituents retained by the ultrafilter to form the venous return. Since some quantities of desirable electrolytes are lost during filtration, a controlled amount of make-up electrolyte solution generally must be added to the purified filtrate to bring it to an isotonic condition.

While the use of this novel combination of filtration means represents a significant improvement over the art by providing both an effective and continuous artificial kidney that can be conveniently worn on the body, the device still faces some problems. The previous use of selective filtration means, for example, that permitted passage of low molecular weight solutes while retaining high molecular weight substances, resulted in some clogging of the membranes, especially at the high filtration rates necessary for the device to operate effectively. While this could be avoided by decreasing filtration rates, the efficiency of the device was, of course, also decreased. Further, a large surface area, and generally on the order of about 2,000 square centimeters, was necessary in the ultrafiltration means to achieve effective and efficient filtrate rates.

The necessity of periodically adding make-up electrolyte solution to the purified filtrate that was returned and mixed with the macromolecular constituents, was a source of contamination to the blood, and the water used in the preparation of this solution had to be carefully treated to be sure it was sterile and pyrogen free.

In accordance with one embodiment of the present invention, it has been found that the foregoing disadvantages can be substantially eliminated and the device described in my copending application improved by replacing the ultrafiltration means with a hemodialysis means. Thus, instead of cleansing the blood by passing it through a filtration means as in my previous device, the blood is cleansed by drawing the toxic substances across a dialysis membrane.

In a hemodialyzer, a carefully formulated dialysate, containing water and a certain concentration of electrolytes, is passed along one side of the membranes in countercurrent flow to the flow of the blood on the opposite side of the membranes to cause selective diffusion of the undesirable toxic substances across the membranes and into the dialysate. The dialysate preferably contains a concentration of electrolytes and water similar to that of the blood to prevent their cross diffusion during hemodialysis.

Thus, the cleansed blood, not depleted of its primary water content, electrolytes or other desirable constituents as occurred previously during ultrafiltration, is immediately suitable for venous return. The spent dialysate is recovered and purified of the toxic substances with the same hyperfiltration means utilized in my previous device and recycled as reconstituted dialysate to the hemodialyzer to provide a compact, mobile device that can be continuously and conveniently worn by the user.

In the present device, the dialysate, containing make-up electrolytes, travels in a closed circuit, independent of the blood circuit, thus eliminating a previous source of blood contamination when make-up electrolyte solution was added directly to venous return.

Further, and because the blood is cleansed by diffusion of toxic substances out of the blood and not by filtration by passing the substances through filters as solutes in the blood's water content, the high filtration rates and the large surface area previously required are substantially reduced, thereby further enhancing the efficiency in both the size and operation of the present device.

In accordance with a further embodiment, the wearable artificial kidney of this invention may also be used in recirculation peritoneal dialysis in which peritoneal fluid from the peritoneum is withdrawn from the body and cleansed of toxic substances such as urea creatinine, uric acid, etc., that have diffused across the peritoneal membrane from the blood and into the peritoneal fluid, thereby reducing the concentration of these toxic substances in the blood. The body fluid suitable for use in the kidney of this invention and as used in the specification and claims is, therefore, intended to include peritoneal fluid as well as arterial blood.

When the kdney is used with peritoneal fluid, the cannulas are inserted into the peritoneal cavity rather than the arteries and a circulating pump is used to withdraw the peritoneal fluid and to pass it to the dialysis means of the kidney. When the kidney is used with blood, the pump is not necessary because the human heart supplies the pressure needed to pass the blood to the dialyzer.

As the peritoneal fluid passes through the dialyzer, the dialyzer cleanses the peritoneal fluid in the same manner as the blood is cleansed and a make-up solution is similarly added to the dialysate returning to the dialyzer.

Thus, the artificial kidney of this invention can be used equally well with either peritoneal fluid or blood and without any significant change in the construction of the device.

In accordance with a preferred embodiment of this invention, the device includes a dialysis means, a dialysate filtration means, a high pressure pump, a metering pump, and a small reservoir for make-up electrolyte solution. The combination of these elements forms a compact device which can be worn on the body with minimum interference to sleep, free movement, daily toilet, sexual activity, and so forth.

More particularly and in accordance with the present invention, arterial blood or peritoneal fluid from the peritoneum is drawn off and fed to one side of the membranes of the dialysis means. A water-containing dialysate, essentially free of toxic solutes in the blood, is passed in countercurrent flow to the body fluid along the other side of the dialysis membranes to establish a concentration gradient, thereby causing diffusion of the toxic solutes into the dialysate. Dialysate is continually flushed through the dialysis means so that the concentration of toxic solutes in the dialysate never reaches its equivalent level in the body fluid being processed and a strong concentration gradient is thereby continuously maintained across the membranes.

The dialysate is carefully formulated to be not only free of toxic solutes, but to contain substances that are desired to be retained in the blood at concentration levels approximately equivalent to their level in the blood. Such substances include, for example, glucose, sodium chloride, sodium bicarbonate, potassium, and other desirable electrolytes. Hence, the dialysate does not establish a concentration gradient for these substances to prevent their loss from the body fluid.

Spent dialysate containing the toxic solutes is then pumped from the dialyzer to the dialysate filtration means, which, preferably, is only permeable to water and electrolytes, by the high pressure pump. The purpose of the dialysate filtration means is to remove the toxic solutes, such as urea, uric acid, creatinine, and the like from the spent dialysate. The filtrate thus contains relatively pure water and is suitable for recycle for use in preparing the dialysate for the dialysis means. The unfiltered residue retained by the filtration means are wastes and are deposited in a small cannister which is periodically emptied.

In operation, most of the electrolytes along with some of the water will be filtered out and rejected along with the wastes. Thus, a small amount of a highly concentrated aqueous solution of electrolytes is fed from the make-up electrolyte reservoir and mixed with the purified dialysate filtrate in the metering pump to provide the necessary reconstituted dialysate for use in the dialysis means. The metering pump supplies a predetermined amount of a highly concentrated aqueous solution of such electrolytes as sodium chloride, potassium, sodium bicarbonate, etc., to the purified dialysate to bring it to an isotonic condition. In most cases, the bulk of the make-up solution is concentrated saline.

When used with peritoneal fluid, the make-up solution metered into the dialysate for return to the dialyzer should also contain dextrose and/or sorbitol in a concentration of about 1% by weight. The dextrose or sorbitol permeates through the membrane in the dialyzer and into the peritoneal fluid to provide, as is well known to those skilled in the art of peritoneal dialysis, an osmotic induced withdrawal of water from the body into the peritoneal fluid. This is required because the kidney of this invention rejects water and this water is provided by withdrawing the water from the body into the peritoneal fluid.

The net result of all the elements of the invention working in combination mimics the function of a normal kidney by discarding nitrogenous wastes while retaining plasma, water, and the concentration of electrolytes in the blood. In some cases, dissolved sugars may be lost, but these may be replaced orally.

It is to be understood that both the foregoing general description and the following detailed description are exemplary and explanatory but are not restrictive of this invention.

The accompanying drawings which are incorporated in and constitute a part of the specification, illustrate several embodiments of the invention, and together with the description serve to explain the principles of the invention.

Of the drawings:

FIGS. 1A, 1B, 1C, and 1D are schematic representations of the device of this invention, in which 1A is the basic embodiment, and 1B, 1C, and 1D are alternative embodiments, being variations of the basic embodiments;

FIG. 2 is a fragmentary perspective view of the construction details of the dialyzer of this invention;

FIG. 3A is a cross-sectional view of a part of the hyperfilter of this invention;

FIG. 3B is an exploded perspective view of an alternative embodiment of the hyperfilter of this invention;

FIG. 7 is an enlarged cross-sectional view taken along line 7—7 of FIG. 4; and

FIG. 8 is an exploded perspective view of one embodiment of an artificial kidney constructed according to this invention.

Reference will now be made in detail to the present preferred embodiments of the invention, examples of which are illustrated in the accompanying drawings.

For convenience, the invention will be described as it relates to the processing of arterial blood. It is to be understood, however, as described above, that peritoneal fluid from the peritoneal cavity may be used in place of blood in the artificial kidney of this invention.

By peritoneal fluid is meant that fluid naturally existing in the peritoneal cavity, supplemented, if desired, to increase its volume with conventional peritoneal dialysis solutions. For a more thorough discussion of peritoneal dialysis as a means for performing the function of a natural kidney and particularly recirculation peritoneal dialysis, reference is made to an article by J. H. Shinaberger, L. Shear and K. G. Barry, entitled," increasing Efficiency of Peritoneal Dialysis," Transactions of American Society of Artificial Internal Organs, volume II, pages 76–82, 1965.

Figure 1A:
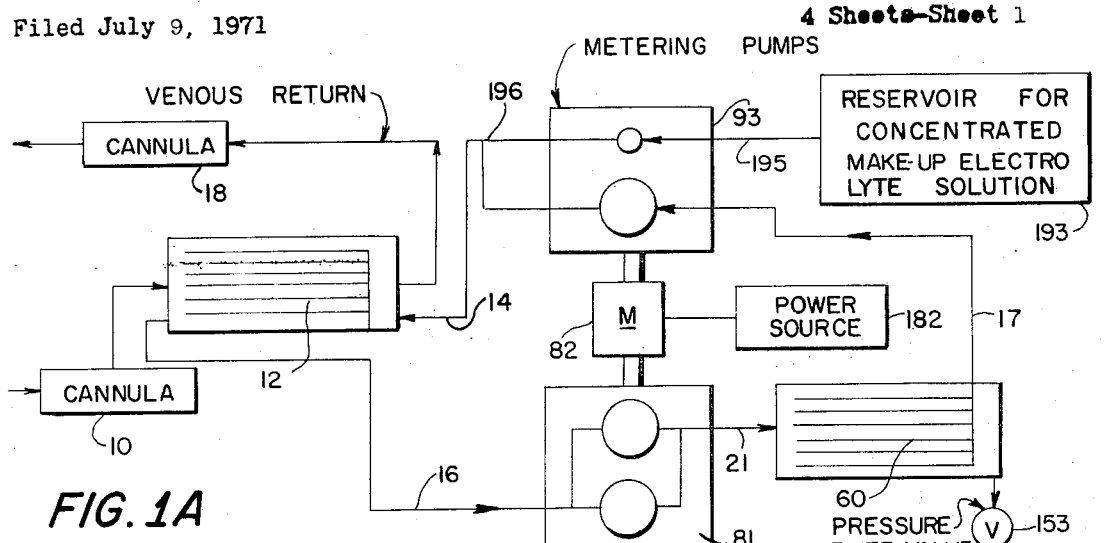

With reference to FIGS. 1A and 8, arterial blood is drawn from the body by a conventional cannula 10 and forced by the pumping action of the body's heart into the dialysis means or hemodialyzer 12. Simultaneously, fresh dialysate 14 is passed through hemodialyzer 12 in countercurrent flow to the blood and spent dialysate 16 is drawn off from the hemodialyzer by the low pressure side of a high pressure pump 81. FIG. 2 shows in more detail the construction of hemodialyzer 12 and will be discussed in more detail below.

Spent dialysate 16 is then channeled through pump 81 and forced through input line 21 to hyperfilter 60 (60' of FIG. 8) by the high pressure side of the pump. The filtrate 17 emerging from hyperfilter 60 is essentially pure water and electrolytes, while the non-permeating solutes 15 are deposited in a detachable urinal 151.

With reference to FIGS. 3A and 3B, the hyperfiltrate 17 from hyperfilter 60 is drawn off transversely and continuously to the filter surfaces 63, while the input 21 which is the spent dialysate 16 under pressure, travels through the hyperfilter with a motion parallel to the filtering surfaces 63 and emerges as a concentrated solution 15 of low molecular weight solutes, such as urea, creatinine, uric acid, and electrolytes. Pressure is maintained at the proper level in hyperfilter 60 by the pump 81 and pressure relief valve 153 in the urine rejection line 15. The relief valve is designed to permit a continuous flow of spent dialysate through hyperfilter 60 and a continuous flow of wastes 15 to urinal 151. Due to the high volume of recovered water 17, the volume of waste 15 is of manageable proportions, and the urinal 151 need be detached and emptied only infrequently.

As previously noted, pump 81 provides the pressure across hyperfilter 60. The pump and the metering system 93 are driven by A.C. or D.C. motor 82 (a D.C. motor is preferred when a wearable system is contemplated) and by power pack 182, which preferably comprises rechargeable batteries. The suction side of the metering system 93 draws hyperfiltrate 17 and a controlled amount of concentrated make-up electrolyte solution 195 from the make-up reservoir 193, and forces them into the same efflux line at 196 to form a reconstituted dialysate 14 with the desired concentration of sodium, potassium, bicarbonate, phosphate, chloride and sulfate ions and the like for return to hemodialyzer 12. The cleansed whole blood is returned to the body via the venous cannula 18.

Referring to FIG. 2, the internal construction details of hemodialyzer 12 of this invention will become evident. This perspective view is fragmentary in that only two (2) complete arterial blood channels 45 and dialysate channels 53 are shown. In practice, the hemodialyzer of this invention contains numerous blood and dialysate channels. The design shown is a laminar arrangement; however, it will be understood that other arrangements may be used, such as tubules, in which the blood and dialysate flow is countercurrent and parallel to the longitudinal axis of the individual tubules. In either case, the polarization of the surfaces of the blood channels is negligible when sufficiently small dimensions are used.

As seen in FIG. 2, the laminar construction consists of a series of membranes 43, a series of porous supports forming dialysate channels 53, and a series of parallel rows of cylinder-shaped spacers 41, all arranged such that the space between the surfaces of two (2) adjacent membranes 43 provides a blood channel 45.

Various membranes suitable for hemodialysis and well known to those skilled in the art may be used as membrane elements 43. Such membranes include: cellophane, cuprophane, polyvinyl alcohol, and cellulose acetate. In selecting the membranes, it is desirable to employ membranes which have heparin or other anti-blood clotting agents incorporated in the membrane. The other materials used in the construction of hemodialyzer 12 which are in contact with the blood should be substantially non-thrombogenic, i.e., not tending to produce blood clots. Preferred non-thrombogenic materials are heparinized polytetrafluoroethylene, heparinized surgical grade silicone, and the like. Thus, spacers 41 are preferably polytetrafluoroethylene mono-filaments marketed by the Du Pont Company under the trade names "Teflon TFE," or "Teflon FEP"; but the porous support material forming dialysate channels 53, since these channels are not directly in contact with blood, can comprise nylon cloth, or the like.

The preferred thickness of channels 53 is fom about 50 to 150 microns. The blood channels 45 between membranes 43 are preferably as small as possible, down to about 7 microns which is the size of a red blood cell. Accordingly, channels 45 will range from about 7 microns up to about 100 microns.

As the arterial blood passes through blood channels 45 parallel to spacers 41 and countercurrent to the flow of dialysate through dialysate channels 53, the toxic blood solutes having a molecular weight less than 10,000 or so diffuse perpendicularly to the blood flow through membranes 43 and into the dialysate channels 53, the spent dialysate 16 containing the solutes being drawn off continuously from the opposite end of hemodialyzer 12. The design described above permits the complete hemodialyzer unit to be housed in a rectangular box with dimensions of 16 x 6 x 0.8 centimeters. The core of the dialyzer unit being approximately 15 x 5 x 0.5 centimeters in volume. The assembled unit weighs approximately 100 grams.

FIG. 3A shows the details of hyperfilter 60 designed similarly to the laminar assembly of hemodialyzer 12 but functioning as a filtration system rather than a dialysis system. The instant assembly consists of a series of spaces each designated 65, defined by membranes 63, the membranes being supported by porous plates 67. Between each set of porous plates 67 is another space 69 from which the hyperfiltrate is drawn off by the manifold as shown. This hyperfiltrate 17 consists essentially of pure water or pure water and electrolytes. The inlet manifold 21 allows spent dialysate drawn from hemodialyzer 12 and passed through pump 81 to pass into spaces 65. The pure water or water plus electrolytes passes through membranes 63 into spaces 69 in a direction that is essentially perpendicular to the flow through spaces 65. The material 15 emerging from spaces 65 and into the outlet manifold is highly concentrated and contains wastes such as urea, uric acid, creatinine, etc.

Since hyperfilter 60 is not in contact with the blood, nonthrombogenic materials need not be used in its construction. The preferred material to be used for membranes 63 is cellulose acetate. These membranes are prepared by dissolving the cellulose acetate in acetone and a conditioning agent, generally formamide. This solution is formed into sheets, and after a preliminary short air evaporation, the material is immersed in cold water, thus removing the acetone and formamide and gelling the cellulose acetate. Subsequently, the film is conditioned by heat treatment at 70 to 90° C. The surfaces of the membranes 63 in contact with the spaces 65 are under high pressure. In our basic embodiment, we prefer at least 600 p.s.i. The total area of these surfaces may vary, and we prefer an active total membrane surface of approximately 1,000 to 3,000 square centimeters.

Again, the membranes of the finished package may be of various dimensions, and in this connection, we prefer 15 centimeters length by about 5 centimeters width by about 1 centimeter or less thickness. This would mean that the entire hyperfilter would comprise about 22 membranes 63. The spacing 65 should be about 50 to 300 microns.

FIG. 3B illustrates an alternative design 60' for the hyperfilter of this invention. The membranes tubes 63' shown in the figure are produced by confining a plug of cellulose acetate solution in acetone in a tube of appropriate diameter, and blowing the plug by means of a column of air under pressure. The advancing air column forces the cellulose acetate solution towards the walls of the support tube, forming it into a thin cylindrical-shaped tube concentric with the supporting wall. A column of water following the air removes the acetone from the mixture, and coagulates the cellulose acetate into a solid hollow tube. Tubes with a diameter of less than 500 microns can easily be made. The preferred diameter is about 250 microns. Thus, the tubes shown in the drawing are greatly enlarged for purposes of illustration. The tubes themselves have little inherent mechanical strength and are supported by porous support tubes, not shown, made from sintered stainless steel, Inconel, silver, tantalum and the like. Non-metallic materials suitable for making support tubes are glass fibers stiffened with epoxy or polyester resin, woven nylon, or glass braid stiffened with resin and fillers, sintered ceramics, and sintered glasses. The tubes should have an outside diameter of about 500 microns, should be microporous, should be able to withstand high internal pressures, and should be inert to body fluids, both in the sense of being corrosion resistant and in the sense of not releasing toxic substances. Thus, the list of materials given above is not intended to be exhaustive, since any material that satisfies these conditions may be used. The tubular type membrane assembly would be similar in volume to the flat plate assembly; a 15-centimeter length, a 1.7 cm. diameter, and an overall weight of about 100 to 150 grams can be obtained in practice. Both hyperfilters 60 and 60' are designed to reduce polarization to a negligible minimum.

Figure 5:
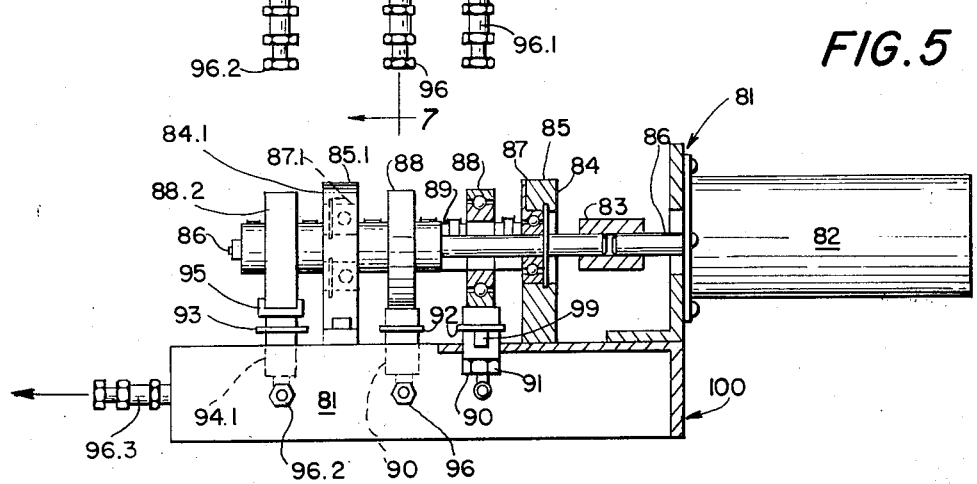
FIG. 5 is a cross-sectional view taken along line 5—5 of FIG. 4.

FIGS. 4, 5, 6, and 7 show the details of the preferred embodiment of the novel high-pressure micro-pump and metering system assembly 81 of this invention. The assembly is mounted on a rigid base 100 and includes a shaft 86, which is common to the micro-pump and metering portions of the assembly and a suitable electric motor 82 for driving shaft 86 through a sleeve coupling 83, a shaft speed of about 3,600 r.p.m. being preferred. Shaft 86 is supported by two (2) shaft hangers 85 and 85.1 which house ball-bearings 87 and 87.1 and retainer rings 84 and 84.1, respectively. Turning with the shaft 86 is a ball-bearing cam system which converts the rotary motion of shaft 86 into reciprocating motion. As shown in FIG. 5, an example of an eccentric drive cam is 89, and an example of a ball-bearing for this cam arrangement is 88.

The reciprocating motion from drive cam 89 is transmitted to the piston 99 of a pump chamber 90 (see FIG. 5) where a silastic pump diaphragm 91 in the chamber is alternately squeezed and released to produce a pumping action. A return spring member 92 is provided to return piston 99 to its original position to limit the return force of the piston and thereby control the suction force produced in chamber 90. By this means, cavitation on the suction side of the pump is regulated. Multiple check valves 96, 96.1, 96.6 and 96.7 regulate the flow and prevent back flow during the pumping cycle.

Figure 6:
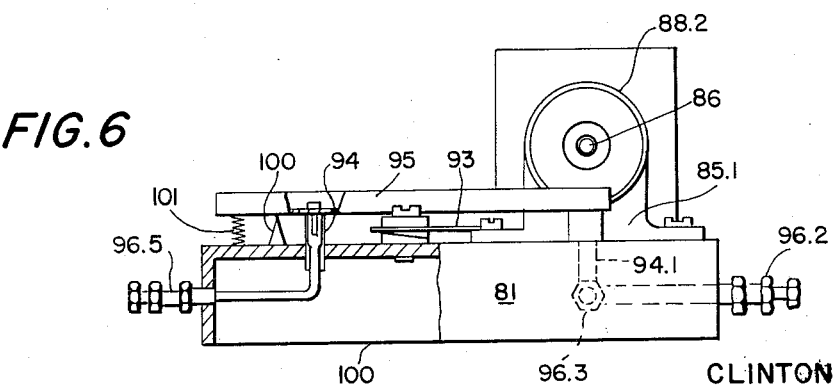
FIG. 6 is a side elevational view of the apparatus of FIG. 4.

The metering portion of assembly 81, as best shown in FIG. 6, consists of pumps 94 and 94.1, which are coupled by a metering regulation arm 95. Metering pump 94.1 is driven by a ball-bearing cam system 88.2 and a return spring member 93 in a manner similar to pump 90 and pump 94 is also driven by drive cam 88.2 through regulation arm 95. Arm 95 is supported by fulcrum 100 and kept in contact with cam 88.2 by spring 101. Pump 94 draws in the concentrated electrolyte solution, and through its displacement is adjustable, it will be set to displace about one-fortieth ($\frac{1}{40}$) the displacement of the pump 94.1. The two (2) metering pumps are mechanically locked together so that the fixed ratio of displacement is maintained, even if the volume pumped should diminish due to suction pressure limitation as described above.

As has also been pointed out, the pump assembly is designed to deliver a pressure of about 600 to 700 p.s.i. and is limited to a suction pressure −5 p.s.i. The pumps 90 of the assembly draw approximately 21 ml. per minute of spent dialysate 16 from hemodialyzer 12, the patient's heart providing the pressure to force the blood into the hemodialyzer and back to return venous cannula 18. The micro-pumps 90 also supply spent dialysate to the hyperfiltration stage at a rate of about 21 ml./minute. The metering pump system is designed to handle up to the full 21 ml. per minute flow, hence it will always be able to pump the efflux from the filtration stage and will always operate in the suction limit condition. This makes for stable operation of the entire high pressure micro-pump metering system.

Turning to FIG. 7, the relationship between pump chamber 90, input and output multiple check valves 96 and 96.7, and the ball-bearing cam system can be seen more clearly. Spring member 92 provides the means for returning piston 99 to its extreme upper position and prevents it from following the cam in the event that the suction pressure limit is exceeded, and by this means prevents cavitation. Diaphragm 91 is permanently bonded to the base of chamber 90 and to piston 99, but is free to move on its sides. The inlet and outlet ports may communicate with the chamber 90 separately, or through a common channel 108, since the multiple check valves 96 and 96.7 control the directional movement of the fluid that is being pumped.

The pump is in operation continuously, hence we prefer a high efficiency pump with a long fatigue life so as to permit a year or more of trouble-free operation. As has been pointed out, 500 to 700 p.s.i. is the preferable pressure output maximum to overcome osmotic back pressure. Furthermore, pressures in the range of 500 to 700 p.s.i. are considered optimum from the standpoint of membrane life. A volume flow of 21 ml./min. is provided for on the basis of purifying 30 liters of dialysate per day. This figure of 30 liters/day is chosen on the basis of engineering and design considerations as equivalent to desired rate of purification of the blood. Physiologically, a range of 20 to about 90 liters of blood/day may be acceptable, the object being to remove from about 8 to about 24 grams/day of urea, as a standard, from the bloodstream.

Generally, the hemodialyzer should permit diffusion of solutes of molecular weight less than 5,000 but can easily be constructed to pass solutes of higher molecular weight as high as 30,000. Blood channels in the hemodialyzer should permit as high a flux as is consonant with low polarization, and with preservation of blood platelets and red cells.

One of the desirable features of this invention is the small amount of volume occupied by the make-up solution, which supplies about 200 to 300 grams of solids/day to the dialysate to replenish that removed by the hyperfilter as waste, and to maintain a concentration of electrolytes in the dialysate equivalent to that in the blood to prevent their removal from the blood during dialysis. The make-up solution can have a concentration of about 200 to 400 mg./ml.; hence, only one or two daily loadings of the small (less than one liter) make-up reservoir are required. We prefer two loadings per day of about 130 grams of solids in 300 ml. of solution. Further, the make-up solution is only added to the dialysate and is never mixed with the patient's blood, thus eliminating a potential source of contamination of the blood from this solution.

Figure 1B:
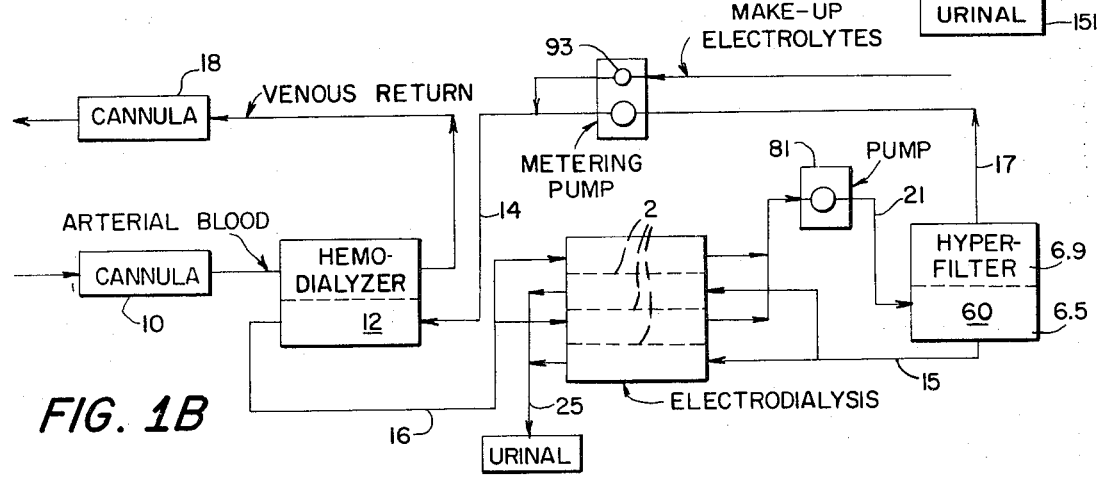
Figure 1C:
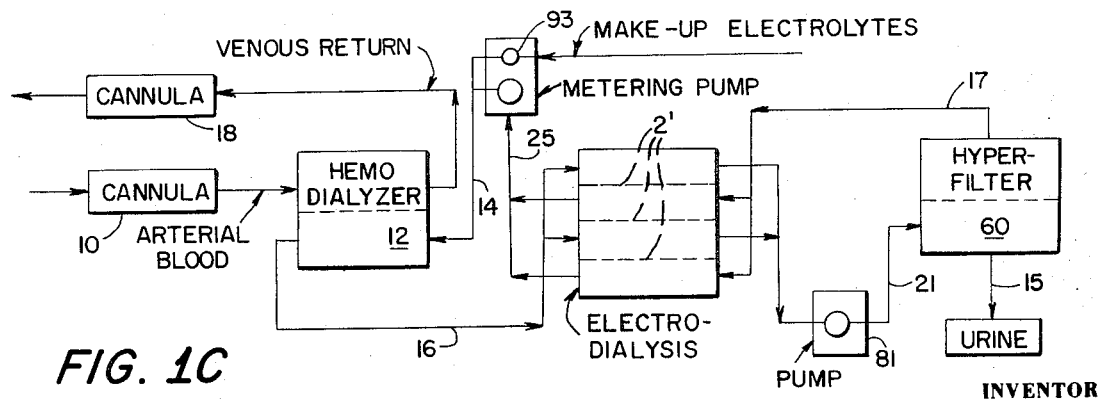
Figure 4:
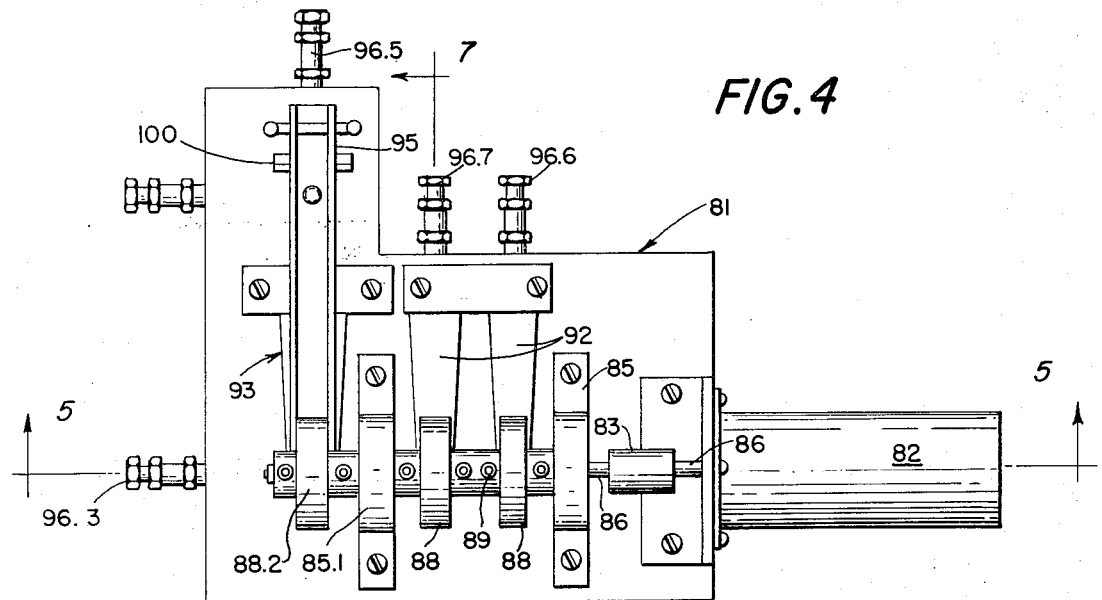
FIG. 4 is a plan view of the motor, high-pressure pump and metering pump of this invention.

Alternative embodiments of this invention can be understood by referring to FIGS. 1B, 1C, and 1D.

In the embodiment shown in FIG. 1B, the electrolytes in spent dialysate 16 are first removed and then discarded with the low molecular weight solutes as waste to reduce the load on hyperfilter 60.

With reference to FIG. 1B, spent dialysate 16 instead of being routed directly to hyperfilter 60 is first passed through a low-power electrodialyzer with membranes 2. The charge differential in the electrodialyzer separates the electrolytes from the non-electrolyte solutes with the help of the membranes. The electrodialyzed, aqueous solution 21 of primarily non-electrolyte solutes is then passed through pump 81 and pumped into hyperfilter 60. The material 15 rejected by the hyperfilter is then returned to the electrodialyzer as the electrodialysate for removal of the electrolytes from dialysate 16. As a result of the electrodialysis treatment, the difference in concentration of electrolytes between the filtrate side 6.9 of the hyperfilter and the retained solute side 6.5 is sharply reduced. Consequently, the waste material 25 deposited in the urinal in the instant embodiment can be more highly concentrated in terms of waste products and electrolytes than is the waste from the hyperfilter in the basic embodiment.

The osmotic pressure across the hyperfilter, which tends to force water from 6.9 to 6.5 and solutes from 6.5 to 6.9 is correspondingly reduced. As a result, the pressure of the pump and hence the energy expended can be reduced and less water is lost to waste 25. The power saved in pumping may be used by the electrodialysis unit to provide the charge differential.

In the basic embodiment described above, i.e., FIG. 1A, pressures in the range of 500 to 700 p.s.i. are required to force water through the hyperfilter. This is so partly because the cellulose acetate skin membranes are tight enough to prevent the passage of small solutes and hence require a substantial pressure drop to force the water through. But a large contributing factor is the high osmotic back pressure which must be overcome before water can pass from the concentrated side 6.5 to the fresh water side 6.9. For a concentration ratio of six, for example, the back osmotic pressure of the concentrated side 6.5 would be approximately 550 p.s.i. In the instant embodiment, the amount of filtrate 17 obtained can be increased without necessity of overcoming increased osmotic pressure on the filtrate side 6.9 of the hyperfilter. Under these conditions, the rejected waste or urine 25 is concentrated to the point where only two (2) liters of this waste are formed daily. It is to be understood that the higher rate of urine formation in the basic embodiment is not a serious disadvantage in that the patient, by drinking an average of less than a cup per hour, can easily replace five (5) liters of fluid per day.

Referring to FIG. 1C, where still another embodiment of the invention is schematically outlined, it will be seen that the advantages of the embodiment of FIG. 1B are retained, while the electrolytes removed from the spent dialysate are utilized to reconstitute purified dialysate. In this embodiment, the electrodialyzed, aqueous solution 21 of primarily non-electrolyte solutes is passed to hyperfilter 60 and the filtrate 17 is returned to the electrodialysis treatment as the electrodialysate rather than the material rejected by the hyperfilter. After leaving the electrodialyzer, instead of flowing to the urinal, as was the case in the previous embodiment, the electrolytes in the purified filtrate 17 flow to metering pump 93 for mixture, if any, with make-up electrolyte and are recycled to hemodialyzer 12 as reconstituted dialysate. The waste retained by the hyperfilter 15 is thus primarily urea, creatinine, uric acid, sugars, and the like. The efflux 25 of the electrodialyzer is free of toxic materials such as urea, and is therefore essentially suitable for reuse.

As in the embodiment shown in FIG. 1B, the osmotic pressure from the filtrate side of hyperfilter 6.9 and the concentrated side 6.5 is reduced by removing the electrolytes in the electrodialyzer, and the rate of urine production is again cut back to about two (2) liters per day. Since the removed electrolytes are utilized in this embodiment, a smaller amount of make-up solution is required. A necessary function of the natural kidney is to remove a small amount of potassium from the blood. Hence, all of the electrolytes cannot be saved, because of the difficulty of separating sodium and potassium ions, and thus with the passing of a small amount of potassium to the urine, so also must pass a similar proportion of sodium ion. It is, therefore, another feature of the instant embodiment to provide means for performing this electrolyte-adjustment function by partial removal of potassium ion. The amount of make-up solution needed will be dependent upon the potassium balance. A reduction in the amount of electrolyte by approximately one-half (½) is feasible.

In FIG. 1D still another embodiment of the invention is schematically illustrated. In this embodiment, the filtering surface of the hyperfilter is a so-called mosaic membrane, which consists of tiny patches of cationic and anionic membranes allowing passage of ions of both polarities under concentration gradients. At the patch boundaries, lateral surface currents prevent the phenomenon known as electric polarization. In any high filtration means, such as the hyperfilter of this invention, the concentration of solutes on the filtrate side 6.9 will be very much lower than on the retention side 6.5, thereby providing a substantial concentration gradient across the membrane. The filtrate 17 in the embodiment of FIG. 1D will contain electrolytes and pure water, while the rejected matter 15 will contain urea, creatinine, uric acid, and the like. It can readily be seen that the instant embodiment is nearly as sophisticated as a natural kidney. As a result, like the embodiment of FIG. 1C, the required amount of make-up electrolytes is considerably reduced. The complete hyperfilter would consist of mosaic membranes in series with cellulose acetate membranes in order to permit controlled electrolyte passage into the hyperfilter.

It is within the scope of this invention to construct a non-wearable artificial kidney employing hemodialysis and hyperfiltration in the manner disclosed. It is also within the scope of this invention to modify the nature of the power source. Any source of electric power, portable or non-portable, can be used with this invention.

Many other modifications in this invention are possible. Various motor and pump arrangements could be substituted without departing from the spirit and scope of the invention. Various modifications of the membranes used in the hemodialyzer and filter could be made. For example, a modification of this invention would be the inclusion of so-called fail-safe features to protect against punctures, leaks, or ruptures in the fluid lines of the system, as well as clogging of the filter. Thus, it is within the scope of this invention to include various shut-down switches which are automatically activated by significant changes in flow or concentration at various points of the system. For example, a sensing switch can be incorporated in the system between the metering pumps and the hemodialyzer to measure the ionic conductivity of the reconstituted dialysate. In the event the metering pumps or filters are malfunctioning and the dialysate has not been adjusted to the proper electrolyte concentration, as determined by the ionic conductivity of the materal, an automatic shut-off switch for the motor will be actuated stopping the kidney and the removal of these electrolytes from the blood. Additionally, a similar sensing switch can be incorporated in the system to measure the ionic conductivity of the waste material in the urinal. Again, if excessive material is passing through the hyperfilter as waste, as determined by the ionic conductivity, an automatic shut-off will stop the motor, alerting the wearer of a malfunction and to a need for a maintenance check.

Various other design features may be incorporated, particularly with regard to the manner in which a compact artificial kidney of this invention is adapted to be worn on the body. For example, the urinal and electrolyte make-up cannister may be adapted to fit comfortably on various parts of the body, such as the legs or hips. Other elements of the device may be adapted to be worn around the waist, build into clothing or the like.

Still another modification of this invention is the inclusion of dextrose or other non-electrolytes in a make-up reservoir connected to the venous return so that the patient need not replace these materials by oral ingestion. It is also within the scope of the invention to use anticoagulants, such as heparin or coumadin, in the artificial kidney system as an added safety factor with regard to possibility of clotting.

This invention in its broader aspects is not limited to the specific details shown and described, and departures may be made from such details without departing from the principles of the invention and without sacrificing its chief advantages.

What is claimed is:

1. Apparatus for removing toxic substances from body fluids comprising:
   (a) dialysis means containing a selective membrane for removing toxic solutes from the body fluid;
   (b) means for conveying the body fluid to one side of the membrane of the dialysis means;
   (c) means for conveying a water-containing dialysate essentially free of said toxic solutes to the other side of the membrane to establish a solute concentration gradient and to cause their diffusion across the membrane;
   (d) dialysate purification means comprising a plurality of membranes with hyperfiltration characteristics enclosed and supported in a suitable housing, said housing having influx means, purified aqueous filtrate efflux means, and toxic solute efflux means for removing the toxic solutes from said dialysate;
   (e) means for conveying spent dialyste containing toxic solutes from the dialysis means to the dialysate purification means, said spent dialysate conveying means being constructed and arranged to permit the interposition between the dialysis means and the dialysate purification, of a means for overcoming osmotic back pressure in the dialysate purification means; and
   (f) means for returning purified dialysate to the dialysis means.

2. The apparatus of claim 1, in which the influx means, the filtrate efflux means, and the toxic solute efflux means of said dialysate purification means are so constructed and arranged that the flow from the influx means to the filtrate efflux is smooth and uninterrupted and is parallel to the filtering surfaces of the hypoperfiltration membranes.

3. The dialysate purification means of claim 2, in which the hyperfiltration membranes are planar.

4. The apparatus of claim 2, in which the hyperfiltration membranes are tubular.

5. The apparatus of claim 4, in which the tubular membranes have an outside diameter of less than 1 mm.

6. The apparatus of claim 2, in which the plurality of hyperfiltration membranes comprise cellulose acetate.

7. The apparatus of claim 2, in which the filtering element comprises at least one homogeneous membrane and at least one mosaic membrane, said mosaic membrane comprising a patchwork of individual membrane segments.

8. The apparatus of claim 1, in which the dialysate purification means comprises:
   an electrodialysis means having influx means for the spent dialysate from the dialysis means, efflux means for the non-electrolyte product of electrodialysis, a second influx means, and a second efflux means;
   a filtration means comprising a hyperfiltration element supported and enclosed in a suitable housing having influx means, filtrate efflux means, and toxic solute efflux means;
   the non-electrolyte efflux means of said electrodialysis means being in communication with the means for overcoming osmotic back pressure, the input means to said filtration means being in communication with the means for overcoming osmotic pressure, the filtrate efflux means being in communication with the means for returning purified dialysate to the dialysis means, the toxic solute efflux means being in communication with the second influx to the electrodialysis means such that the toxic solutes conveyed thereto will mix with the aqueous electrolytes retained by the electrodialysis means, and the second efflux means of the electrodialysis means connected with means for discarding electrolytes and toxic solutes.

9. The apparatus of claim 1, in which the dialysate purification means comprises:
   an electrodialysis means having influx means for the spent dialysate from dialysis means, efflux means for the non-electrolyte product of electrodialysis, a second influx means, and a second efflux means;
   a filtration comprising a hyperfiltration element enclosed and supported in a suitable housing having influx means, filtrate efflux means, and efflux means for retained toxic solutes;
   the non-electrolyte efflux means being connected by suitable communication means with the means for overcoming osmotic back pressure, and the means for overcoming osmotic back pressure being so arranged as to convey by suitable communication means the non-electrolyte product to the filtration input means, the toxic solute efflux means being so constructed and arranged as to permit the discarding of the toxic solutes, the filtrate efflux means being in communication with the second influx means of the electrodialysis means, such that the filtrate conveyed thereto will mix with the aqueous electrolytes retained by the electrodialysis means, and the second efflux means of the electrodialysis means being in communication with the means for returning purified dialysate to the dialysis means.

10. The apparatus of claim 1, in which the means for overcoming osmotic pressure comprises a cam-driven reciprocating pump with suction-limiting means.

11. The apparatus of claim 1, in which the dialysis means comprises a plurality of semi-permeable membranes so constructed and arranged that the flow of body fluid is smooth and uninterrupted and is parallel to the surfaces of the membranes.

12. The dialysis means of claim 11, in which the membranes are planar.

13. The dialysis means of claim 11, in which the membranes are tubular.

14. The apparatus of claim 1, including:
   a make-up electrolyte fluid reservoir, and means for introducing small increments of said fluid from the reservoir into purified diaysate being returned to the dialysis means to maintain a level of concentration of electrolytes in the dialysate substantially equal to the level of concentration of the electrolytes in the body fluid.

15. The apparatus of claim 14, in which the means for introducing the make-up electrolyte fluid comprises a metering pump, the pump's inputs communicating with the make-up electrolyte fluid reservoir and the dialysate purification means and its outputs with means for combining the outputs as reconstituted dialysate.

16. The apparatus of claim 15, in which the metering pump is mechanically linked to the means for overcoming osmotic back pressure in the dialysate purification means, the means for overcoming osmotic back pressure comprising a pump with a greater displacement than the metering pump.

17. The apparatus of claim 14, in which the make-up electrolyte fluid reservoir contains less than 300 grams of solids dissolved in less than 1 liter of water.

18. An artificial kidney comprising:
an arterial cannula;
hemodialysis means containing semi-permeable membranes for removing toxic solutes from the blood;
a first conduit means providing communication between the arterial cannula and the membranes, said conduit means being so arranged that the arterial blood flows smoothly and uninterruptedly over one surface of the membranes;
a second conduit means providing communication of a water-containing dialysate essentially free of said toxic solutes to the hemodalysis means, said second conduit means being arranged so that the dialysate flows smoothly and uninterruptedly over the opposite surface of the membranes from and countercurrent to the flow of blood, a third conduit means providing communication of spent dialysate containing the toxic solutes from the hemodialysis means to a high-pressure pump;
a filtration element permeable to pure water but essentially impermeable to the toxic solutes;
a fourth conduit means providing communication between the high-pressure pump and the filtration element;
means for introducing, at a predetermined rate, increments of an aqueous solution of electrolytes into the filtrate flowing from the filtration element;
said second conduit means conveying the resulting mixture of said filtrate and said electrolyte solution as reconstituted dialysate to the hemodialysis means; and
means for conveying the resulting purified blood residue from the hemodialysis means to a venous cannula.

19. The apparatus of claim 18, in which the hemodialysis means comprises a stack of rectangular membrane sheets spaced by rows of filaments parallel to each other and to the edges of the sheets, each pair of spaced membrane sheets being separated from the pair immediately above and the pair immediately below by sheets of porous support material disposed parallel to and contiguous with the surfaces of the membrane sheets.

20. A method of removing toxic substances from the blood comprising:
subjecting arterial blood to hemodialysis utilizing a semi-permeable membrane and a dialysate essentially free of toxic substances in the blood, such that the toxic solids diffuse through the membrane into the dialysate, filtering the spent dialysate containing the toxic solutes to remove them from the dialysate, mixing filtered dialystate with a controlled amount of make-up electrolyte solution and recycling the mixture of filtered dialysate and electrolytes for further use during hemodialysis.

21. The method of claim 20, in which electrodialysis is used in combination with the filtration, such that osmotic back pressure from the purified dialysate filtrate to the retained toxic solutes is reduced.

22. The method of claim 21, in which selective electrodialysis is used to recover electrolytes from the spent dialysate, and these electrolytes are then added to the purified dialysate filtrate.

23. A method of removing toxic substances from peritoneal fluid, comprising:
subjecting the peritoneal fluid to peritoneal dialysis utilizing a semi-permeable membrane and a dialysate essentially free of toxic substances in the peritoneal fluid, such that the toxic solids diffuse through the membrane into the dialysate, filtering the spent dialysate containing the toxic solutes to remove them from the dialysate, mixing filtered dialysate with the controlled amount of make-up electrolytes solution and recycling the filter dialystate and electrolytes for further use during dialysis.

24. The method of claim 23, in which electrodialysis is used in combination with the filtration, such that osmotic back pressure from the purified dialysate filtrate to the retained toxic solutes is reduced.

25. The method of claim 24, in which selective electrodialysis is used to recover electrolytes from the spent dialysate and these electrolytes have been added to the purified dialysate filtrate.

References Cited
UNITED STATES PATENTS

| | | | |
|---|---|---|---|
| 3,506,126 | 4/1970 | Serfass et al. | 210—259 X |
| 3,401,798 | 9/1968 | Hyrop | 210—321 |
| 3,228,876 | 1/1966 | Mahon | 210—22 |
| 3,268,441 | 8/1966 | Lindstrom | 210—22 |
| 3,483,867 | 12/1969 | Markovitz | 210—23 X |
| 3,630,378 | 12/1971 | Bauman | 210—321 X |
| 3,579,441 | 5/1971 | Brown | 210—23 |
| 3,498,909 | 3/1970 | Littman | 210—23 |

FRANK A. SPEAR, Jr., Primary Examiner

U.S. Cl. X.R.

210—23, 321

UNITED STATES PATENT OFFICE
CERTIFICATE OF CORRECTION

Patent No. 3,799,312                     Dated March 26, 1974

Inventor(s) Clinton L. Brown

It is certified that error appears in the above-identified patent and that said Letters Patent are hereby corrected as shown below:

Column 11, line 61, change "hypoperfil-" to -- hyperfil- --.

Column 12, line 23, before "connected" insert -- being --;

line 31, before "comprising" insert -- means --.

Signed and sealed this 10th day of September 1974.

(SEAL)
Attest:

McCOY M. GIBSON, JR.                C. MARSHALL DANN
Attesting Officer                    Commissioner of Patents